June 18, 1957    F. J. BUCHMANN ET AL    2,796,436

OXO PROCESS — DIOLEFIN REMOVAL DURING CARBONYLATION

Filed Feb. 16, 1954

EGI V. FASCE
FRED J. BUCHMANN
JOSEPH K. MERTZWEILLER    INVENTORS

BY *Henry Berk*    ATTORNEY

United States Patent Office 2,796,436
Patented June 18, 1957

2,796,436

OXO PROCESS—DIOLEFIN REMOVAL DURING CARBONYLATION

Fred J. Buchmann, Joseph K. Mertzweiller, and Egi V. Fasce, Baton Rouge, La., assignors to Esso Research and Engineering Company, a corporation of Delaware Application February 16, 1954, Serial No. 410,545

5 Claims. (Cl. 260—604)

The present invention relates to the preparation of oxygenated organic compounds by the reaction of carbon monoxide and hydrogen with carbon compounds containing olefinic linkages in the presence of a carbonylation catalyst. More specifically, the invention relates to a process whereby the quality of the product may be improved, the reaction time considerably reduced, and feed streams hitherto not utilizable for the process may be employed.

It is now well known in the art that oxygenated organic compounds may be synthesized from olefins by reaction of the latter with carbon monoxide and hydrogen in the presence of catalyst containing cobalt or iron, preferably the former, in a two-stage process. In the first stage, the olefinic material, the catalyst, and proper proportions of CO and $H_2$ are reacted to give a product which consists predominantly of aldehydes, and this material is hydrogenated in the second stage to give the corresponding primary alcohols. The over-all reaction consists essentially of an addition of $H_2$ and CO to the unsaturated linkage and may be formulated as follows:

Stage 1 

Stage 2 

It is thus seen that both the aldehyde and the alcohol formed as a result of the reaction contain one more carbon atom than the olefinic material from which they are derived.

The carbonylation reaction provides a particularly effective method for preparing valuable primary alcohols which find large markets particularly as intermediates for detergents and plasticizers. The carbonylation, or "Oxo" process, as it is sometimes called, may be used effectively with long and short chain olefinic compounds, depending upon the type alcohol desired. Thus straight and branch chained olefins, such as propylene, butylene, pentene, hexene, heptane, olefin polymers such as di- and tri-isobutylene, hexene and heptene dimers, polypropylenes, and olefinic fractions from the hydrocarbon synthesis process, thermal or catalytic cracking operations, and other sources of hydrocarbon fractions containing such olefins may be used as starting material, depending on the nature of the final product desired. In general, olefins having up to about 18–20 carbon atoms in the molecule are preferred in this reaction.

The catalysts for the first stage of the process are usually employed in the form of salts of the catalytically active metals with high molecular weight fatty acids, such as stearic, palmitic, oleic, naphthenic and similar acids. Thus, as suitable catalysts are such organic salts as cobalt stearate, oleate, or naphthenate. These salts are soluble in the liquid olefin feed and may be supplied to the first reaction zone as hydrocarbon solutions or preferably, dissolved in the olefin feed. Also, cobalt carbonyl itself, as well as inorganic forms of cobalt, as cobalt oxide, also cobalt acetate and formate and carbonate may be used. Aqueous solutions containing the cobalt carbonyl anion may also be used.

The synthesis gas mixture fed to the first stage may consist of any ratio of $H_2$ to CO, but preferably these two gases are present at about 1.0 volume hydrogen per volume CO. The conditions for olefins reacting with $H_2$ and CO vary somewhat in accordance with the nature of the olefin feed, but the reaction is generally conducted at pressures in the range of about 1500 to 4500 p. s. i. g. and at temperatures in the range of about 150° to 450° F.

The quantity of $H_2$+CO with respect to olefins used may vary within wide ranges, for example, from 2500 to 45,000 cu. ft. of $H_2$+CO per barrel of olefin fed. In general, about 4000 to 10,000 cu. ft. of $H_2$+CO per barrel of olefin fed are employed.

At the end of the first stage, the reaction product and unreacted materials are generally transferred to a catalyst removal zone wherein soluble catalyst is removed by suitable means, and thence to a hydrogenation vessel, where the aldehydes are hydrogenated to alcohols. As hydrogenation catalyst there may be employed such materials as supported or unsupported metallic nickel, cobalt, sulfactive catalysts as tungsten, molybdenum and nickel sulfides, alone or in combination, copper chromite, or other carbonyl group-reducing catalysts. In the hydrogenation step, the temperatures are generally between the range of 150°–550° F. and the pressures within the range of about 1500–4500 p. s. i. g.

As useful a tool for organic synthesis as this aldehyde synthesis process is, it has nonetheless been found hitherto that not all olefinic substances are equally susceptible to the carbonylation, or "Oxo" reaction. Thus, some highly branch chained olefins react with difficulty, and others do not react at all, probably as a result of steric factors. It has also been found that olefinic feed stocks resulting from cracking processes, particularly when steam cracking is employed, or when petrolatum is cracked, underwent the aldehyde synthesis reaction erratically. Some of these stocks could not be carbonylated at all under customary and conventional carbonylation conditions, whereas other stocks from these sources exhibited a lengthy induction period prior to reaction; once the reaction started, however, it proceeded rapidly. Most of these feed stocks had essentially straight chains and, in the case of the product resulting from petrolatum cracking, alpha olefinic linkages; these types of olefins are generally considered to be most suitable for rapid carbonylation reactions.

The process of the invention is based upon the discovery that the erratic carbonylation results observed when subjecting olefins resulting from steam cracking and other cracking processes to the aldehyde synthesis reaction is directly attributable to the di-olefin impurity usually present in these products. Olefin feeds from these sources, including butenes, $C_6$—$C_{10}$ naphthas, and cracked petrolatum olefins, all were subjected to bomb carbonylation reaction with 1:1 $H_2$/CO gas at 300°–400° F. and 2700–2800 p. s. i. in the presence of 0.3% cobalt as cobalt oleate for five hours, without any reaction taking place. Subsequent analyses of these olefins showed that they all contained concentrations of 1–5% or higher of conjugated di-olefins. The present invention relates to an improved and novel method of treating di-olefin-containing olefinic compounds which are to be subjected to the aldehyde synthesis reaction.

It has been suggested hitherto to subject di-olefins to the aldehyde synthesis, or "Oxo" reaction. However, the prior art has repeatedly pointed out that di-olefins react extremely rapidly and are so sensitive to the reagents employed in the process that often only resinous products result; also, some experimental work has indicated that partial reaction to form a saturated monoaldehyde occurs. However, when the di-olefinic content of the olefin feed is relatively small, say above about 2–3%, the surprising result has now been found that the entire reaction is either completely halted or considerably retarded.

In accordance with the present invention the poisoned feed stock is treated to remove or make innocuous the diolefinic impurity. This treatment may, in certain cases and with certain reagents, be carried out prior to passage of the contaminated feed stock to the aldehyde synthesis or carbonylation zone. Thus the contaminated olefin product may be treated with selective polymerizing agents, such as maleic anhydride or its methyl derivative, citraconic anhydride, aluminum halides, lithium aluminum hydrides, aluminum alkyls, alkyl aluminum halides, boron trifluoride and the like, prior to its passage to the carbonylation zone, to remove selectively diolefinic impurities. The diolefin-contaminated olefin may also be subjected to clay treating, mild hydrogenation with catalyst selective to conversion of dieolefins to monoolefins, also to extraction with specific solvents such as copper ammonium acetate or similar compounds which selectively remove polyolefins from solution.

In another embodiment of the present invention, the diolefin-contaminated olefin product is treated with specific reagents which remove or make innocuous the contaminant, the treatment being carried out in the presence of the carbonylation catalyst at carbonylation conditions and in the presence of synthesis gas, as will be made more clear below.

In accordance with one embodiment of the present invention, the poisoned feed stock to the aldehyde synthesis reaction zone is subjected initially in the selective hydrogenation reaction, preferably in the presence of a non-carbonyl forming catalyst to convert substantially all the polyolefins into mono-olefins, and leave substantially unchanged the mono-olefins originally present in the feed. Carbonyl forming metals and their compounds must be avoided because during the later catalyst decompositions stage more fully described below, the carbonyls would contaminate not only the aldehyde product but also the aldehyde synthesis catalyst.

By this process, not only is the potential aldehyde product increased and reaction rates accelerated, but also no intermediate purification steps, such as distillation, nor by-product recovery steps are required. Thus, feed stocks containing more than about 2% conjugated diolefins, such as butadiene, isoprene, pentadiene, etc., may be utilized, not only at reasonable synthesis reaction rates, but also to supply increased yields of mono-alcohols.

It is well known that when there are two or more unsaturated groups in a molecule, the question as to which of these will be hydrogenated first depends on the nature of the groups and of the compounds, the catalyst, and the experimental conditions. Compounds containing conjugated systems of unsaturation are very readily reduced to paraffins, for there is a strong tendency for both double bonds to be hydrogenated at about the same rate, and with most of the known hydrogenation catalyst the reaction products obtained at half-hydrogenation of dienes may contain considerable amounts of unreacted diene and fully saturated compounds, together with some mono-olefins. If the diene is initially present in the mono-olefin, a significant proportion of the latter is also converted to the paraffin.

It is, therefore, the principal purpose of the present invention to improve the carbonylation reaction by treating the olefinc feed stock with a material and by a process adapted to remove or make innocuous diolefinic and polyolefinic impurities.

It is also a purpose of the present invention to pretreat a diene-containing olefinic compound with a hydrogen-containing gas in the presence of a catalyst which is selective for conversion of di-olfins to mono-olefins, which will not convert mono-olefins to saturated compounds to any significant extent under the conditions in which diolefins are converted to monoolefins, and which will not combine with carbon monoxide contained in the hydrogen gas to form metallic carbonyls.

It is also a purpose of the present invention to disclose an integrated process for carrying out the aldehyde synthesis reaction which will permit the employment of feeds hitherto not found suitable for the process.

Other and further objects and advantages of the present invention will be more apparent hereinafter.

In one of the embodiments of the present invention it has been found that these advantages and objectives may be attained when a diene-containing olefinic feed stock is contacted under selective hydrogenation conditions with certain selected catalysts whereby the diolefins are converted to mono-olefins of the same number of carbon atoms without materially decreasing the amount of monoolefins in the feed; thus this treatment increases as well the potential oxonatable content of the feed. By removal of the dienes from the system, the reaction time and the induction period are appreciably diminished.

The catalysts employed for the process may include the sulfide type of hydrogenation catalyst; in particular, molybdenum sulfide on activated carbon has been found to give excellent results in diminishing the induction period without decreasing the potential aldehyde content of the feed. Nickel and iron sulfides, however, are preferably avoided because these compounds contain metals tending to form carbonyls, or other complexes and compounds with carbon monoxide. Inasmuch as in accordance with a preferred embodiment of the present invention the total feed to be oxonated is passed to the aldehyde synthesis reactor, the lower portion of which contains the prehydrogenation catalyst, and the prehydrogenation is carried out with hydrocarbon synthesis gas (i. e., 1/1 $H_2/CO$ gas) at substantially oxo conditions, it will be appreciated that carbonyl forming metals would not only be carried out of the prehydrogenation zone, but would also be later precipitated in part along with the aldehyde synthesis catalyst, and in part be left in the aldehyde streams, both of which must be avoided. Other catalysts that may be employed under conditions to hydrogenate selectively the diolefins, are tungsten sulfide and other similar sulfide type catalysts. There may also advantageously be employed a platinum or palladium catalyst, preferably supported on a suitable carrier. In the presence of the CO, these catalyst composites, containing about 0.2–1% of the metal, are mildly and selectively poisoned so that they are active for hydrogenation of diolefins to mono-olefins but are relatively inactive for the hydrogenation of mono-olefins to paraffins. Palladium is preferable because of its lower cost and more favorable initial selectivity for this reaction.

By avoidance of carbonyl-forming metals, it is thus possible to hydrogenate with the synthesis gas, or hydrogen-fortified synthesis gas, and other carbon monoxide-comprising streams associated with the aldehyde synthesis reaction process.

It may be possible to explain the inhibiting effect of di-olefins upon the carbonylation reaction by postulating the free radical carbonylation mechanism below. According to this mechanism the di-olefin, which has a greater affinity for the hydrogen free radical (hydrogen atom) than the olefin feed, breaks the chain and functions as an inhibitor. Once the inhibitor is consumed by hydrogenation, the carbonylation reaction can take place at its normal rate.

(1) 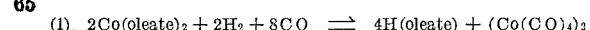

(2) 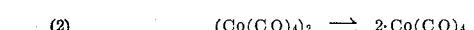

(3) 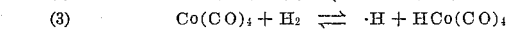

(4) 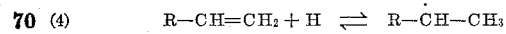

(5) 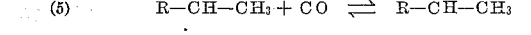

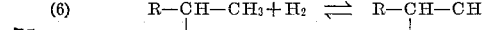

(6) 

The process of this invention may be applied to a large variety of feed stocks which are to be converted to aldehydes and alcohols. Of particular advantage is the employment in the process of relatively unbranched terminal olefins to produce plasticizers and detergent alcohols of high quality. These olefins are produced in large number, particularly those boiling in the $C_6$—$C_{18}$ range, by the thermal cracking of wax. Due to their di-olefinic content, which may be up to 10% and higher, however, they have been difficult to convert to aldehydes in the continuous aldehyde synthesis reaction process. Also, butene fractions containing butadiene, and other thermally, catalytically or steam cracked products may be thus successfully treated; also, the liquid stream from the low pressure cracking of gas oil.

In one embodiment of the present invention, the hydrogenation catalyst is contacted with the Oxo feed either in the liquid or vapor phase at 200°–500° F., and at pressures which may range from atmospheric up to the aldehyde synthesis reaction pressures 2500–3500 p. s. i. g. in the presence of hydrogen or hydrogen-carbon monoxide mixtures.

A further benefit in operating in accordance with this embodiment of the present invention is the removal by conversion to mono-olefins, of potential color and resin forming bodies from the reaction mixture. Diolefins in the feed, on oxonation after the lengthy induction period, may produce unsaturated aldehydes, resins and ring compounds unstable in the distillation section; on decomposition, unsaturated aldehydes boiling in or near the alcohol boiling range would be obtained.

The embodiment of the present invention which relates to prehydrogenating the oxo feed prior to its passage to the carbonylation stage will best be understood from the more detailed description hereinafter, wherein reference will be made to the accompanying drawing which is a schematic representation of a system suitable for carrying out a preferred embodiment of the invention.

Turning now to the drawing, Oxo feed which may comprise any desired compounds having olefinic unsaturation, and which may have a di- or poly-olefinic compound content of from about 2% to 25%, or even higher, is passed into hydrogenation reactor 4 through line 2. It has been determined that the inhibiting effects became pronounced at diene contents of about 2%; if the feed contains less dienes than this, the hydrogen pretreatment may not be necessary.

Hydrogen comprising gas is passed into reactor 4 through line 6. As will be made more clear hereinafter, the hydrogen feed advantageously is a portion of the synthesis gas feed stream that is used in the aldehyde synthesis step. If desired, all of the synthesis gas may be passed initially through reactor 4; in such case, the mol ratio of $H_2$ to $CO$ of the feed gas is greater than one, so that the mol ratio of hydrogen to diolefin content within reactor 4 is at least about 2/1. Analysis of the diene content of the feed is necessary, therefore, to determine the amount and mol ratio of the hydrogen passed to reactor 4.

Within reactor 4, there is disposed a bed of catalyst comprising a catalyst adapted to hydrogenate only di-olefins to mono-olefins; an excellent catalyst for this purpose is one comprising about 10% molybdenum sulfide supported on activated carbon. Such catalyst, besides having excellent activity for the process, also removes sulfur from the feed stream. Reaction conditions comprise temperatures of about 200°–500° F., pressures from atmospheric to 3500 p. s. i. g., preferably 2500 to 3500 p. s. i. g., a liquid throughput rate of 0.5–10 v./v./hr., and a mol ratio of hydrogen to diolefin of a minimum of 2/1. The selection of conditions determines whether a vapor, vapor-liquid or liquid phase operation obtains in zone 4. Use of aldehyde synthesis pressures would result in a liquid phase operation with substantially all di-olefin-contaminated olefin feeds. It is advantageous to maintain pressures in the prehydrogenation zone of the same order of magnitude as in the subsequent carbonylation zone, for thereby pumping between vessels is eliminated.

Conditions of throughput rates, liquid feed rates, and gas inlet linear velocities having been adjusted responsive to the diene content of the olefin feed to give a residence time sufficient to decrease the diene content to a point where it no longer interferes with the carbonylation reaction, the liquid product is withdrawn from prehydrogenater 4 through line 8 and is passed to gas-liquid separator 10, maintained substantially at the same or similar pressure as reactor 4. Gas separated may in part be recycled through lines 12 and 13 to fresh feed synthesis gas line 2 for recirculation through the system or be passed to reactor 20.

Liquid product is withdrawn downwardly through line 16, admixed with 0.1–0.5% by weight of cobalt catalyst (as cobalt) injected through line 22, and passed into Oxo reactor 20. Simultaneously, a gas mixture containing $H_2$ and $CO$, preferably in about equal proportions, is passed into reactor 20 through line 24. As indicated above, the total gas supply to reactor 20 may be the effluent gas from separator 10 of the prehydrogenation stage. If desired, however, only a portion of the off gas from reactor 4 need be passed to reactor 20, the balance being supplied through lines 14 and 24. Furthermore, under some circumstances, as when a low pressure is maintained in reactor 4, it might be desirable to use an independent supply of high pressure gas to reactor 20.

Reactor 20 is preferably operated at a pressure of about 2500–3500 p. s. i. g. and at a temperature of about 350°–450° F., depending upon the olefin feed and other reaction conditions. The rate of flow of synthesis gases and olefin through reactor 20 is so regulated that the desired conversion level of the olefin is obtained. Because of the conversion of diolefins previously, reaction is rapid, without an appreciable induction period.

Liquid oxygenated reaction products containing catalyst in solution and unreacted synthesis gases are withdrawn overhead from an upper portion of high pressure reactor 20 and are transferred though line 26 to cooler 28 in which any conventional means of cooling are employed, and from there to high pressure separator 30 where unreacted gases are withdrawn overhead through line 32, scrubbed of entrained liquid and cobalt carbonyl and used in any way desired. They may be recycled to synthesis gas feed line 14 or 6 or purged.

A stream of primary reaction product containing dissolved therein relatively high concentration of cobalt carbonyl is withdrawn from separator 30 through line 32. A portion of said withdrawn stream may be recycled, if desired, to reactor 20 via line 34 and recycle pump 35 to aid in the cooling and maintenance of temperature control of the primary carbonylation stage. The balance of the primary reaction product may be withdrawn through pressure release valve 37 and through line 36. The withdrawn liquid may comprise unreacted olefin and secondary reaction product as well as aldehydes and dissolved catalyst compounds, and it is passed to a catalyst removal, or decobalter zone, which may be one of several kinds now described in the art. A thermal decobalting process operates at about 200°–400° F. and at pressures of atmospheric to about 400 p. s. i. g., and an inert stripping gas, such as hydrogen may be supplied through line 38; the cobalt carbonyl is decomposed into cobalt metal and other solid material, while liberated $CO$ and the $H_2$ gas are withdrawn through line 42. This gas mixture may be recycled to the prehydrogenation stage.

Other good, and better, means of decobalting include treatment of the cobalt contaminated aldehyde product with live steam, hot water, or aqueous solution of organic acids, where a chemical rather than a thermal decobalting occurs. Since cobalt carbonyl is decomposed considerably more readily than nickel or iron carbonyl, it is important to prevent the formation of these substances in the course of the reaction, for they would only be partially decomposed under circumstances wherein all of the cobalt carbonyls are decomposed. Remaining in the aldehyde product, these carbonyls would foul the inlet and heat transfer lines and surfaces of the subsequent hydrogenation stage, and form deposits on the hydro catalyst. Thus, when a CO-containing gas is employed in hydrogenating the diolefins in reactor 4, carbonyl forming catalysts, such as compounds of nickel and iron, are to be avoided.

From the decobalter the cobalt-free aldehyde product is passed to a hydrogenation stage for conversion into alcohol, all in a manner known per se.

This embodiment of the invention admits of numerous modifications apparent to those skilled in the art. Thus, it may be desirable, under some circumstances, to recycle hydrogen streams from the aldehyde hydrogenation unit (not shown) to the prehydrogenation stage. Such hydrogen stream is reasonably free of CO. However, most refinery $H_2$ streams have at least 1–2% CO, while most streams from Oxo stages have considerably more than this. Also, a particularly efficient mode of operation is to maintain the prehydrogenation stage and the aldehyde synthesis stage in the same confined space, which is readily feasible inasmuch as both may be operated at the same pressure. In such operations, the bottom portion of the Oxo reactor is supplied with the selective hydrogenation catalyst of the invention, and the cobalt catalyst introduced downstream in the direction of flow. Also, the synthesis gas stream may be split, a portion passing to the prehydrogenation stage along with all the feed to be treated, and the balance introduced downstream into the aldehyde synthesis reaction zone.

This embodiment of the invention may be further illustrated by the following specific examples.

The effect of dienes in inhibiting the aldehyde synthesis reaction has already been mentioned. The following data demonstrate this more clearly:

Example I

A freshly distilled sample of crude $C_7$—$C_8$ olefin obtained from petrolatum cracking, which on analysis has been found to contain about 5–6% diolefins, was subjected to the aldehyde synthesis reaction in an autoclave at 350° F. with 1/1 $H_2$/CO gas at 3000 p. s. i. g. in the presence of 2% cobalt oleate catalyst. No reaction occurred during 8 hours on these conditions.

Example II

A heptene fraction boiling between about 165°–210° F. and prepared by polymerizing propylene and butylene in the presence of a phosphoric acid-on-kieselguhr catalyst was contacted at 315° F. in a bomb with an equimolar $H_2$/CO gas at 2700 p. s. i. pressure in the presence of 0.3% cobalt as cobalt oleate. This particular feed has been found by extensive laboratory work to carbonylate quite readily though there is considerable branching in the molecule, and the amount of terminal olefin groups is small. After a short induction period of 15–20 minutes, the feed stock reacted rapidly, and the conversion of heptenes to the corresponding iso-octyl aldehydes was approximately 70–80% complete at the end of 5 hours reaction in the bomb.

Example III

To determine the effects of known amounts of di-olefins in an olefin whose induction period is known, blends were prepared of said heptene fraction and 2-methyl 1,3 pentadiene. Separate samples were prepared containing the olefin and di-olefin. Reaction conditions included contact with 1/1 $H_2$/CO gas and 0.3% cobalt as cobalt oleate catalyst. Charges of the same size were used, and heating up to 315° F. reaction temperatures. The pressure drop as indicated on the pressure recorder was used to determine the length of the induction period. The runs were all made in a glass-lined shaker autoclave to avoid complication from contamination of feed content from metal surfaces.

| Olefin | Percent Diene | Induction Period (Hrs.) |
|---|---|---|
| $C_7$ | 0 | ¼ |
| $C_7$ | 1 | 1½ |
| $C_7$ | 3 | 4½ |
| $C_7$ | 5 | >10 |

The above data clearly show the effect of the presence of dienes in olefinic feed streams, and the necessity for their removal before use of the latter in the aldehyde synthesis reaction.

Example IV

The following data represent the results obtained when an olefinic naphtha fraction obtained by steam cracking and clay treating is subjected to the aldehyde synthesis reaction with and without prior pretreatment in accordance with the present invention. As catalyst for the pretreating stage, 10% molybdenum sulfide on activated carbon was employed.

| | A | B |
|---|---|---|
| Hydrogenation Conditions: | | |
| Catalyst Concentration, Wt. Percent | | 6.0 |
| Hydrogenating Gas | | 1/1 $H_2$—CO |
| Temperature, °F | | 300 |
| Pressure, p. s. i. g | | 3,100 |
| Time on Conditions, Hrs | | 2 |
| Inspection on Hydrogenated Feed (Not Hydrogenated): | | |
| Gravity, °API | 42.2 | 43.2 |
| Bromine No | 73 | 73 |
| Diolefin Content, Mg. Mole/Gm | 1.03 | 0.61 |
| Oxonation Conditions: | | |
| Catalyst | Cobalt Oleate | |
| Catalyst Concentration, Wt. Percent | 0.2 | |
| Temperature, °F | 325 | |
| Induction Period, Hrs | 3.0 | 0.75 |
| Total Reaction Time, Hrs | 4.0 | 2.0 |

These results clearly show that, whereas the unhydrogenated feed had an induction period of 3 hours, that is, the length of time necessary for the reaction to start, the hydrogen pretreated product, and pretreated at aldehyde synthesis conditions with 1/1 $H_2$—CO gas required only ¾ of an hour before reaction began. There was no loss of mono-olefins as a result of this pretreatment.

In accordance with another embodiment of the present invention, it has been found that in carbonylation of olefins with CO and $H_2$ in the presence of a cobalt catalyst, unexpected advantages are obtained by treating the olefinic feed stock, particularly when it is derived from cracking processes, with a material adapted to remove or make innocuous di-olefinic impurities, when this treating is carried out in the presence of the carbonylation catalyst at carbonylation conditions and synthesis gas. More particularly, it has been discovered that by treatment of the olefinic feed stocks with an agent which dimerizes the di-olefin but, under the reaction conditions, is substantially inert to the mono-olefins, not only is the induction period of the latter in the carbonylation reactor substantially decreased, but some feed stocks hitherto unresponsive to the aldehyde synthesis reaction may now be caused to undergo this reaction. Specifically, it has been found that markedly improved carbonylation results are obtained by adding to olefinic feed stocks containing from 1 to 5% and higher of conjugated di-olefins, which feed stocks are generally derived from cracking of petroleum fractions, a small amount of an organic peroxide, such as di-tertiary butyl peroxide, and passing the mixture to the aldehyde synthesis reaction zone.

In accordance with this embodiment of the present invention, the di-olefin-containing olefinic feed stock has added to it prior to or during its introduction into the aldehyde synthesis zone about 0.05–1% of a peroxide, preferably an organic peroxide relatively soluble in the olefin. Such materials include di-tertiary butyl peroxide, benzoyl peroxide, acetyl peroxide, and even naturally-occurring organic peroxides, such as formed by the air oxidation of olefins and di-olefins.

The process of this embodiment of the invention may be further illustrated by the following specific examples.

Example V

Two sets of two runs each were conducted in the bomb employing in (1) crude $C_7$—$C_8$ olefins from petrolatum cracking and in (2) a caustic washed sample from (1).

A relatively freshly distilled sample of this material, which on analysis was found to contain about 37 parts per million of peroxide oxygen and about 5–6% di-olefin, was subjected to the aldehyde synthesis reaction in an autoclave at 350° F. with 1/1 $H_2$/CO gas at 3000 p. s. i. g. in the presence of 2% cobalt oleate catalyst. No reaction occurred during eight hours in these conditions. After a period of standing, during which the peroxide content of the material had built up, a second sample of the same material, this time having a peroxide oxygen content of 206 p. p. m. was subjected to the aldehyde synthesis reaction. A third sample of the same material was caustic washed, as shown in the following.

1400 cc. of the crude $C_7$—$C_8$ olefins were caustic treated by washing with 1000 cc. of 10 wt. percent NaOH, water washing, drying with anhydrous $Na_2SO_4$, and filtering. Inspection of the crude and caustic washed samples is shown below.

| | Crude $C_7$-$C_8$ Cut | Caustic Washed $C_7$-$C_8$ Cut |
|---|---|---|
| Gravity, A. P. I. | 61.8 | 61.2 |
| Bromine No. | 148 | 159 |
| Peroxide $O_2$ p. p. m. | 206 | 123 |
| Refractive Index | 1.45181 | |
| Mol. Percent di-olefins | 5.5 | 5.2 |
| Engler Range, °F. | 198–264 | |

In run A, 500 cc. (361 grams) of the crude $C_7$—$C_8$ olefins containing 0.3% cobalt as cobalt oleate, were charged to a glass lined bomb. The bomb was flushed out with 1000 p. s. i. 1:1 $H_2$/CO gas to remove air, heated to 315° F. and pressurized to 2800 p. s. i. synthesis gas. The induction period lasted for 4 hours, at the end of which time the pressure dropped 700 lbs. and maximum peak temperature of 440° F. was noted. The reaction was continued for a total of 21 hours or until essentially complete. Yield of Oxo product=129%.

Run B was a duplicate of run A except that 1% by weight on olefin feed di-tertiary butyl peroxide was added to the feed-catalyst mixture prior to oxonation. The induction period was 4¼ hours. At the end of this induction period reaction started with initial pressure drop of 500 p. s. i. and maximum temperature peak of 420° F. Reaction was complete after 20 hours. Yield of Oxo product=129% by wt. of feed.

Run C was a similar type blank run (no added peroxide) carried out on the caustic washed $C_7$—$C_8$ olefin feed and duplicating run A. The induction period was 6 hours 25 minutes, as compared with 4 hours in previous blank runs with crude $C_7$—$C_8$ olefin feed. The presence of peroxide in the crude $C_7$—$C_8$ olefin feed may be responsible for the lower induction period. Caustic treating removed part or most of the peroxide, thus increasing the observed induction period in run C.

Run D was a duplicate of run C with caustic treated $C_7$—$C_8$ olefin feed except that 1% di-tertiary butyl peroxide was added to the olefin-catalyst feed to the Oxo step. The observed induction period was 4 hours, or less than that observed in the case of the blank run C. The reaction temperature peak was 430° F. and total reaction time was 13 hours as against 19 hours in blank run C. Thus, addition of 1% of peroxide did decrease the induction time in the case of the $C_7$—$C_8$ olefin feed after caustic washing.

The data are summarized below:

| Feed | Naturally Occurring Organic Peroxide, p.p.m. | Wt. Percent Added Di-tertiary Butyl Peroxide | Induction Period, Hrs. | Total Reaction Time, Hrs. |
|---|---|---|---|---|
| Crude $C_7$-$C_8$ Olefin (Freshly Distilled) | 37 | 0 | >8 | |
| Crude $C_7$-$C_8$ Olefin (After Standing) | 206 | 0 | 4 | 21 |
| Do | 206 | 1.0 | 4¼ | 20 |
| Caustic Washed $C_7$-$C_8$ Olefin | 123 | 0 | 6½ | 19 |
| Do | 123 | 1.0 | 4 | 13 |

Example VI

To determine the effects of known amounts of di-olefins in an olefin whose induction period is known, blends were prepared of said heptene and 2-methyl 1,3 pentadiene. To determine the effect of peroxides in decreasing the inhibiting or induction periods, separate samples were prepared containing the olefin, di-olefin, and peroxide. Reaction conditions included contact with 1/1 $H_2$/CO gas and 0.3% cobalt as cobalt oleate catalyst. Charges of the same size were used, and heating up to 315° F. reaction temperature. The pressure drop as indicated on the pressure recorder was used to determine the length of the induction period. The runs were all made in a glass-lined shaker autoclave to avoid complication from contamination of feed content from metal surfaces.

| Olefin | Percent Diene | Percent Peroxide | Induction Period, (Hours) |
|---|---|---|---|
| $C_7$ | | | ¼ |
| $C_7$ | 1 | | 1¼ |
| $C_7$ | 3 | | 4½ |
| $C_7$ | 5 | | >10 |
| $C_7$ | | 1 | ¼ |
| $C_7$ | 5 | 1 | 5½ |
| $C_7$ | 3 | 1 | 2½ |
| $C_7$ | 3 | 0.1 | 2¼ |

The above data clearly show the effect of the presence of dienes in olefinic feed streams, and the beneficial results obtained upon treatment of these streams with di-tertiary butyl peroxide. Addition of as little as 0.1% by weight of the feed results in a marked reduction in the induction period. Thus, cracked olefins containing 2–3% or more of di-olefins which cannot be carbonylated at all, or require induction periods of from 4 to more than 10 hours may now be made suitable for this reaction by treatment with small amounts of organic peroxides.

Example VII

To show that the presence of synthesis gas and cobalt catalyst is required for the peroxide to be effective in reducing the induction period, a series of experiments were carried out wherein a $C_7$ olefinic fraction containing 3% of hexadiene and 1% di-tertiary butyl peroxide in the presence and absence of 0.33% cobalt catalyst was heated at 315° F. for 2½ hours under 500 p. s. i. nitrogen gas pressure, followed by aldehyde synthesis with 2800 p. s. i. pressure and 1:1 $H_2$/CO gas.

Under these conditions there was no reduction in the induction period for the $C_7$ olefin-di-olefin aldehyde synthesis reaction. These observations point to the necessity of synthesis gas being present in order to obtain the promotional effect of the organic peroxide.

While the foregoing description and exemplary operations have served to illustrate specific applications and results, the invention is not limited thereto. Other modifications may appear to those skilled in the art. Thus it is to be understood that while this invention relates to the removal of diolefins from olefinic feeds derived from any source, it is particularly advantageous when used in conjunction with olefinic feeds to the Oxo or carbonylation reaction obtained by steam cracking or vapor phase cracking of naphthas, gas oils, petrolatum and waxes. Furthermore, under certain circumstances, certain distillation techniques for removing diolefins may advantageously be employed, such as fractional distillation, azeotropic distillation, extractive distillation and the like. Also, under certain circumstances the polymerization techniques with aluminum halides, boron fluoride, and the like may advantageously be employed not only to remove diolefins but tertiary monoolefins as well, thus leaving behind the more suitable and more readily oxonatable primary and secondary olefins. Other polymerization agents besides those already mentioned are sulfuric acid, benzene sulfonic acid, phosphoric acid, zinc chloride and the like.

By freeing the feed from di-olefins or by removing diolefins is meant the removal or the transformation of the diolefinic contaminants so that they no longer exist in the monomeric condition, or are converted into other materials, or are removed from the Oxo feed which undergoes the carbonylation reaction.

The present application is a continuation-in-part of Serial No. 219,895, filed April 7, 1951, now abandoned, and Serial No. 292,350, filed June 7, 1952.

What is claimed is:

1. In a carbonylation process wherein olefinic carbon compounds contaminated with minor amounts of diolefins are contacted in a carbonylation reaction zone with CO and H₂ and a carbonylation catalyst at elevated temperatures and pressures to produce oxygenated organic compounds containing at least one more carbon atom than said olefinic compounds, the improvement which comprises treating said contaminated olefinic compounds during the carbonylation reaction under carbonylation conditions in the presence of carbon monoxide and hydrogen gas and cobalt carbonylation catalyst at elevated temperatures and pressures with an agent adapted to react selectively with said polyolefins, said agent comprising an organic peroxide.

2. An improved process for preparing oxygenated organic compounds from mono-olefinic hydrocarbons contaminated with up to about 10% of di-olefinic impurities and containing not more than about 0.05% of organic peroxides, which comprises passing said contaminated olefinic material to a carbonylation reaction zone, adding to said zone carbon monoxide, hydrogen, a cobalt-comprising carbonylation catalyst and a minor amount of an organic peroxide, and maintaining in said zone elevated temperatures and pressures conducive to the formation of an aldehyde product having at least one more carbon atom than said mono-olefinic compound.

3. The process of claim 2 wherein about 0.05% to about 1% by weight of organic peroxide based on olefin fed is added to said zone.

4. The process of claim 2 wherein said contaminated olefinic product is obtained from the cracking petroleum fractions.

5. The process of claim 2 wherein said peroxide is ditertiary butyl peroxide.

References Cited in the file of this patent

UNITED STATES PATENTS

| | | |
|---|---|---|
| 1,982,536 | Perkins | Nov. 27, 1934 |
| 2,398,930 | Gary | Apr. 23, 1946 |
| 2,517,383 | Brooks | Aug. 1, 1950 |
| 2,544,271 | Liedholm | Mar. 6, 1951 |
| 2,752,395 | Harvey et al. | June 26, 1956 |

FOREIGN PATENTS

| | | |
|---|---|---|
| 843,849 | Germany | July 14, 1952 |
| 684,958 | Great Britain | Dec. 31, 1952 |
| 685,728 | Great Britain | Jan. 7, 1953 |

OTHER REFERENCES

Sachanen: Conversion of Petroleum, 2nd ed., Reinhold Publ. Co., N. Y. (1948), page 1.